United States Patent
Haber et al.

(10) Patent No.: US 8,503,969 B2
(45) Date of Patent: *Aug. 6, 2013

(54) RADIO RECEIVER POWER MANAGEMENT SYSTEMS AND METHODS

(71) Applicant: Cresta Technology Corporation, Santa Clara, CA (US)

(72) Inventors: George T. Haber, Los Altos Hills, CA (US); Mihai H. Murgulescu, San Jose, CA (US)

(73) Assignee: Cresta Technology Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,506

(22) Filed: Jan. 25, 2013

(65) Prior Publication Data

US 2013/0137389 A1    May 30, 2013

Related U.S. Application Data

(63) Continuation of application No. 11/781,195, filed on Jul. 20, 2007.

(51) Int. Cl.
    *H04B 1/16* (2006.01)
(52) U.S. Cl.
    USPC .................... 455/343.1; 455/73; 455/130

(58) Field of Classification Search
    USPC ...................................................... 455/343.1
    See application file for complete search history.

(56) References Cited

U.S. PATENT DOCUMENTS

| | | | |
|---|---|---|---|
| 7,324,832 B2 * | 1/2008 | van Rooyen | 455/552.1 |
| 7,369,815 B2 * | 5/2008 | Kang et al. | 455/73 |
| 2003/0203722 A1 * | 10/2003 | Karlquist et al. | 455/130 |
| 2006/0025105 A1 * | 2/2006 | Sato | 455/343.1 |

* cited by examiner

*Primary Examiner* — Ajibola Akinyemi
(74) *Attorney, Agent, or Firm* — Law Office of Andrei D Popovici, PC

(57) ABSTRACT

According to some embodiments, an analog radio receiver circuit is configured alternatively in a full-power mode when the receiver is situated in a cradle and connected to an external power source, and in a power-saving mode when the receiver is not connected to the external power source. In the power-saving mode, a scaled-down power level is supplied to an analog radio signal processing circuit component such as an amplifier, filter, oscillator, or mixer. Scaling down the power supplied to analog circuit components allows reducing their power consumption, at the expense of degraded circuit performance (e.g. increased non-linearity and intermodulation, decreased filter selectivity). Switching between full-power and power-saving modes may be achieved by controlling the connection of internal nodes of the signal processing circuit to a power source, and/or inserting circuit components (e.g. resistors, active devices, filter poles) into the signal processing circuit.

26 Claims, 3 Drawing Sheets

RADIO RECEIVER POWER MANAGEMENT SYSTEMS AND METHODS

RELATED APPLICATION DATA

This application is a continuation of U.S. patent application Ser. No. 11/781,195, filed Jul. 20, 2007, entitled "Mobile Radio Receiver Power Management Systems and Methods," which is herein incorporated by reference.

BACKGROUND

This invention relates to radio communications systems and methods, and in particular to systems and methods for managing the power consumption and performance of analog radio receiver integrated circuits.

The demands placed on the batteries of radio communications devices have increased as such devices incorporate increasingly complex functionality. Increasing power demands pose new challenges for system designers attempting to balance system functionality and power consumption requirements.

SUMMARY

According to one aspect, a method of controlling a radio receiver comprises determining whether the radio receiver is connected to an external power source; when the radio receiver is connected to the external power source, configuring the radio receiver in a full-power mode to supply a full power level to an analog circuit component of a signal processing circuit of the radio receiver; and when the radio receiver is not connected to the external power source, configuring the radio receiver in a power-saving mode to supply a scaled-down power level to the analog circuit component.

According to another aspect, a radio receiver includes a radio signal processing circuit configured to process a set of electric signals derived from a set of radio signals; and a power control circuit connected to the signal processing circuit and configured to control a supply of a full power level to an analog circuit component of the signal processing circuit of the radio receiver when the radio receiver is connected to an external power source; and control a supply of a scaled-down power level to the analog circuit component when the radio receiver is not connected to the external power source.

According to another aspect, a method of controlling a performance of an analog radio receiver signal processing circuit comprises determining whether a radio receiver including the signal processing circuit is connected to an external power source; when the radio receiver is connected to the external power source, supplying a full power level to an analog circuit component of the signal processing circuit; and when the radio receiver is not connected to the external power source, supplying a scaled-down power level to the analog component.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

The following description illustrates the present invention by way of example and not necessarily by way of limitation. Any reference to an element is understood to refer to at least one element. A set of elements is understood to include one or more elements. A plurality of elements includes at least two elements. Any recited connection is understood to encompass a direct operative connection or an indirect operative connection through intermediary structure(s). A radio receiver may include components such as a radio transmitter, user interface, display, and data storage media, among others, in addition to components configured to receive/process radio signals. A circuit component refers to a part of a circuit, and may include multiple interconnected transistors, resistors, capacitors, and/or other individual circuit devices. A scaled-down power level is a non-zero power level lower than a full power level.

Figure 1:
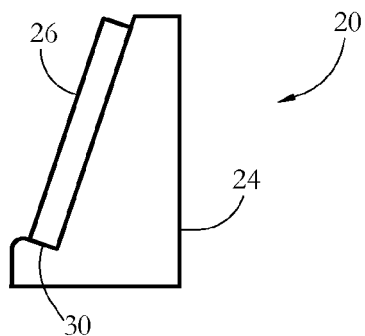
FIG. 1 shows a system including a radio communications device and associated charging cradle, according to some embodiments of the present invention.

FIG. 1 shows a system 20 including a radio transceiver device (transmitter/receiver) 26 and associated charging cradle 24, according to some embodiments of the present invention. Device 26 may be a conventional radio receiver capable of receiving radio-frequency (e.g. FM radio, satellite/XM radio, GSM) signals and playing back audio and/or video data encoded by the signals. Device 26 may include a mobile phone or other bidirectional radio communications device. Device 26 is placed in cradle 24 for charging and for in-cradle use, and removed from cradle 24 for autonomous, self-powered use away from cradle 24. When within cradle 24, device 26 is electrically connected to cradle 24 along an interface surface 30.

Figure 2:
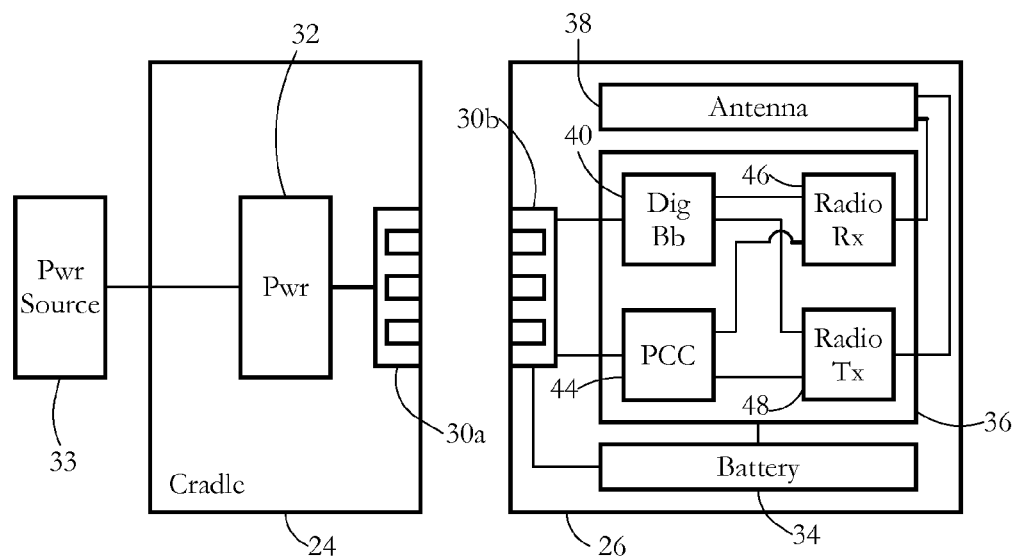
FIG. 2 is a schematic diagram of the cradle and radio communications device of FIG. 1 according to some embodiments of the present invention.

FIG. 2 is a schematic diagram of cradle 24 and device 26 according to some embodiments of the present invention. Cradle 24 includes a power supply circuit 32 connected to a power source 33 external to cradle 24 and device 26, and a docking interface 30a connected to power supply circuit 32. Power source 33 may be the electrical grid or a car battery, for example. Device 26 includes a docking interface 30b configured to mate with interface 30a when device 26 is situated in cradle 24. Device 26 further includes a battery 34 and a transceiver integrated circuit 36 connected to interface 30b, and an antenna 38 connected to transceiver circuit 36. Battery 34 powers transceiver circuit 36, and is charged through interface 30b when device 26 is connected to cradle 24. Antenna 38 receives/and or sends data from/to transceiver circuit 36.

Transceiver circuit 36 includes a digital processor 40, a power control circuit (PCC) 44, an analog radio receiver circuit 46, and an analog radio transmitter circuit 48. Radio receiver circuit circuit 46 and radio transmitter circuit 48 are connected to antenna 38, digital processor 40 and power control circuit 44. Radio receiver circuit circuit 46 and radio transmitter circuit 48 include analog circuitry configured to process received radio-frequency signals and generate outgoing radio signals, respectively. Such analog circuitry may include components such as filters, amplifiers, and oscillators, among others. Digital processor 40 is connected to docking interface 30b, receiver circuit 46 and transmitter circuit 48. Digital processor 40 includes a processor such as a microcontroller configured to perform digital processing functions such as digital baseband modulation.

PCC 44 is connected to docking interface 30b, receiver circuit 46 and transmitter circuit 48. PCC 44 sets the power modes of receiver circuit 46 and transmitter circuit 48 according to a cradle-connection status of device 26. When device 26 is connected to cradle 24, PCC 44 sets receiver circuit 46 and transmitter circuit 48 to a full-power, performance-optimized mode. When device 26 is not connected to cradle 24, PCC 44 sets receiver circuit 46 and transmitter circuit 48 to a power-saving, degraded-performance mode. In some embodiments, PCC 44 may include or be formed by a simple one-bit connection (pin) or one-bit register field indicating whether device 26 is docked in cradle 24.

Figure 3:
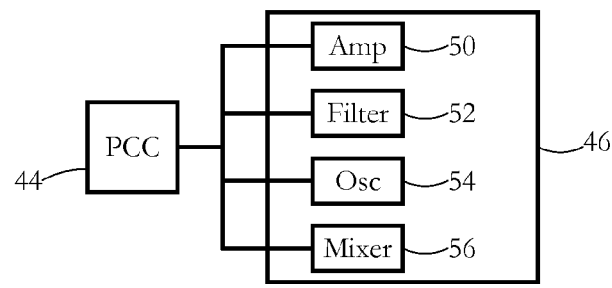
FIG. 3 shows a radio receiver circuit including a number of exemplary circuit components configurable in full-power and power-saving modes by a power control circuit, according to some embodiments of the present invention.

In the full-power mode, a number of analog processing stages of circuits 46, 48 are provided with performance-optimized, relatively-high power levels. In some embodiments, such processing stages include fixed-gain and/or variable-gain amplifiers, filters, oscillators, and mixers, among others. FIG. 3 shows a number of exemplary analog circuit components of receiver circuit 46, configurable in full-power and power-saving modes by PCC 44: an amplifier 50, a filter 52, an oscillator 54 and a mixer circuit 56. In the power-saving, degraded-performance mode, the analog circuit components are provided with scaled-down, power-consumption optimized power levels. The performance characteristics (e.g. linearity, noise, filter roll-off, oscillator phase noise) of analog circuitry (e.g. CMOS or bipolar) generally depend on the power supplied to the circuits. Providing maximum power to such components optimizes their performance, which may be particularly desirable indoors or in other environments having RF-obstructing structures.

The process of configuring circuits 46, 48 in full-power and power-saving modes may be better understood by considering the configuration of several circuit components described below. The description below uses particular examples of circuit configurations and transistor types (e.g. bipolar, MOS); other circuit configurations and transistor types may be used in some embodiments of the present invention. For example, in some embodiments, all power control/switching transistors are MOS (n-MOS or p-MOS) transistors, while all other transistors are bipolar or MOS transistors.

Figure 4:
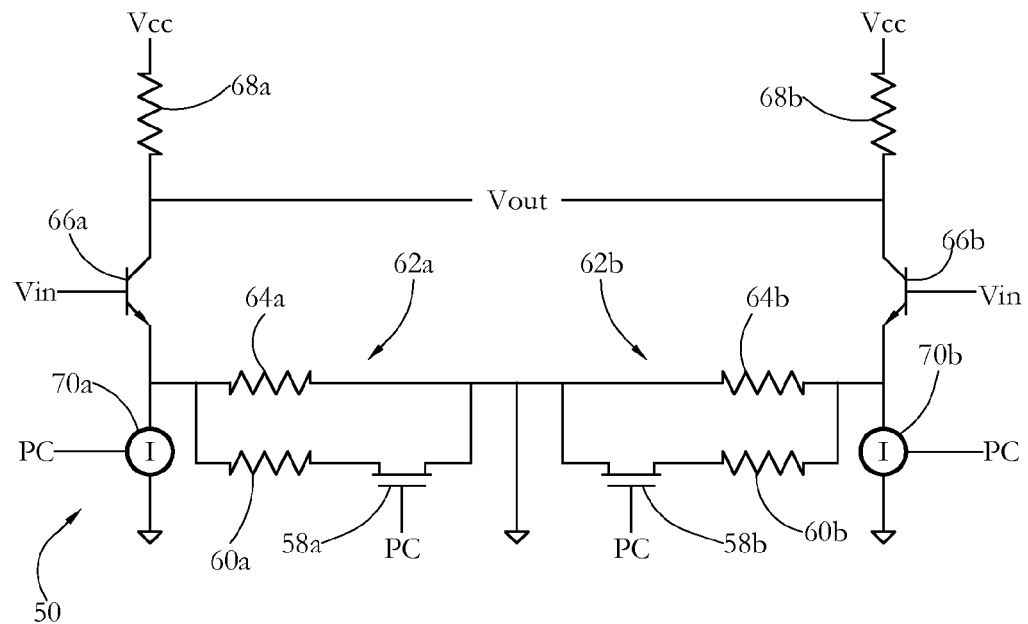
FIG. 4 illustrates an exemplary amplifier circuit capable of being configured in full-power and power-saving modes, according to some embodiments of the present invention.

FIG. 4 illustrates an exemplary fixed-gain amplifier circuit 50 capable of being configured in full-power and power-saving modes, according to some embodiments of the present invention. Amplifier circuit 50 includes two power-control transistor devices 58a-b having their gates connected to PCC 44 (FIG. 2). Power-control devices 58a-b control the effective insertion and removal of corresponding power control resistors 60a-b into/from emitter degeneration resistive circuits 62a-b, respectively. Resistive circuit 62a includes resistors 60a, 64a connected in parallel, while resistive circuit 62b includes resistors 60b, 64b connected in parallel. The collectors of devices 66a-b are connected to a voltage $V_{cc}$ through resistors 68a-b, respectively. The emitters of devices 66a-b are connected to ground through current sources 70a-b and resistive circuits 62a-b, respectively. An input voltage $V_{in}$ is provided at the commonly-connected gates of devices 66a-b, while an amplified output voltage $V_{out}$ is output at the collectors of devices 66a-b. As described below, PCC devices 58a-b and current sources 70a-b operate under the control of power control signals PC received from PCC 44 (FIG. 2).

In the full-power, performance-optimized mode, PCC devices 58a-b are turned off, the resulting equivalent resistance of circuits 62a-b has a high value, and current sources 70a-b set the current through devices 66a-b to a high, performance-optimized value. In the power-saving, degraded-performance mode, PCC devices 58a-b are turned off, the resulting equivalent resistance of circuits 62a-b has a low value, and current sources 70a-b set the current through devices 66a-b to a low, power-saving value. The voltage gain of amplifier circuit 50 is identical in both modes. Increasing the current through devices 66a-b leads to increased power consumption, and at the same time improved linearity for amplifier circuit 50. The linearity of amplifier circuit 50 may be characterized by the value of the IP3 (third order intercept point) parameter. In the full-power mode, the emitter degeneration provided by the relatively-high equivalent resistance of circuits 62a-b allows achieving improved circuit linearity. In exemplary embodiments, the circuit linearity increases with the product of the transconductance of devices 66a-b and the emitter degeneration resistance of circuits 62a-b. The transconductance increases with the current through devices 66a-b. Increasing the current through devices 66a-b and the resistance of resistive circuits 62a-b improves the linearity of amplifier circuit 50 while the amplifier gain is kept constant.

An exemplary variable-gain amplifier may be generated by inserting current steering quads between the collectors of devices 66a-b and resistors 68a-b, respectively, in the configuration of FIG. 4. Such a variable-gain amplifier may be switched between full-power and power-saving modes using PCC devices 58a-b as described above.

Figure 5:
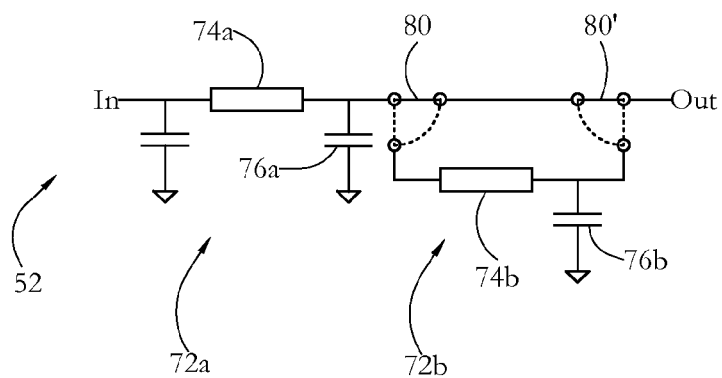
FIG. 5 illustrates an exemplary analog filter circuit capable of being configured in full-power and power-saving modes, according to some embodiments of the present invention.

FIG. 5 illustrates an exemplary analog RC or LC filter circuit 68 capable of being configured in full-power and power-saving modes, according to some embodiments of the present invention. Filter circuit 68 includes multiple sequential filter stages 72a-b including corresponding inductive/resistive elements 74a-b and capacitors 76a-b, respectively. In some embodiments, elements 74a-b are inductors, and filter circuit 68 is an LC filter. Suitable inductors may be implemented using active devices. In some embodiments, elements 74a-b are resistors, and filter circuit 68 is an RC filter. A set of switches, shown schematically at 80, 80', are used to insert and/or remove filter stage 72b into/from filter circuit 68 under the control of PCC 44 (FIG. 2). Switches 80, 80' may be implemented using active devices. The performance characteristics of filter circuit 68 depend on whether filter stage 72b is connected as part of filter circuit 68. For example, inserting filter stage 72b into filter circuit 68 improves the roll-off (width of the filter transition band) of filter circuit 68, while leading to an increase in the power consumption of filter circuit 68.

In the full-power, performance-optimized mode, switches 80, 80' connect filter stage 72b to stage 72a, and filter circuit 68 has a relatively steep roll-off. In the power-saving, degraded-performance mode, switches 80, 80' disconnect filter stage 72b from filter circuit 68, and filter circuit 68 has a flatter roll-off. Disconnecting filter stage 72b leads to a scaling-down of the power supplied to filter circuit 68, and results in lower power consumption by filter circuit 68. If an LC filter, filter circuit 68 includes three poles in the power-saving mode, and five poles in the full-power mode. If an RC filter, filter circuit 68 includes one pole in the power-saving mode, and three poles in the full-power mode. In some embodiments, filter circuits and/or disconnectable power-control filter stages may include higher numbers of poles than shown in FIG. 5.

Figure 6:
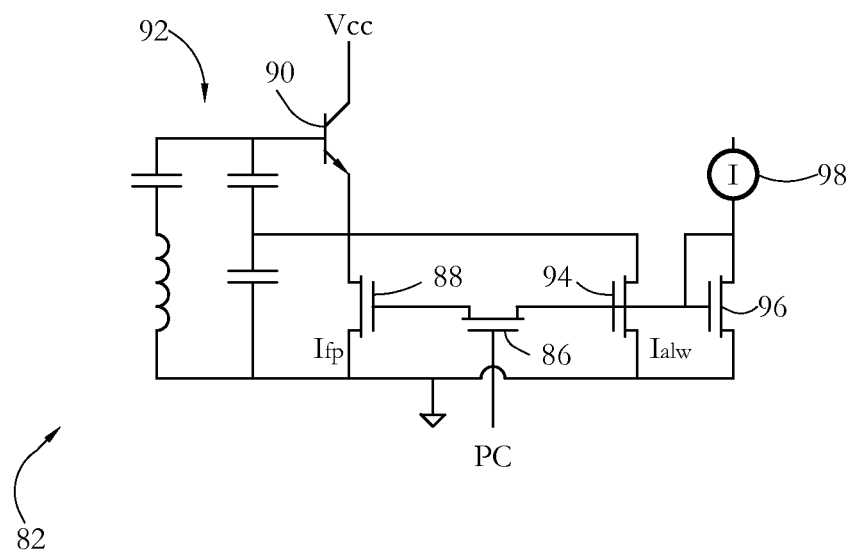
FIG. 6 shows an exemplary analog oscillator circuit capable of being configured in full-power and power-saving modes, according to some embodiments of the present invention.

FIG. 6 shows an exemplary analog oscillator circuit 82 capable of being configured in full-power and power-saving modes, according to some embodiments of the present invention. Oscillator circuit 82 includes a power control transistor device 86 having its gate connected to PCC 44 (FIG. 2), for receiving a power control signal PC. A full-power current path transistor device 88 and an always-on current path transistor device 94 establish corresponding current paths between ground and $V_{cc}$ through a transistor device 90. A transistor device 96 connects a current source 98 to ground. Current source 98 is also connected to the gate of device 94. A capacitive/inductive circuit section 92 is further connected between ground and the gate of device 90.

Power control device 86 turns on/off a full-power current path $I_{fp}$ through transistor device 88. Device 88 has its gate connected to power-control device 86. An always-on current path $I_{alw}$ carries current regardless of the status (on/off) of power control device 86. Increasing the current through device 90 by turning on the full-power current path through device 88 increases the power consumption of oscillator circuit 82, and at the same time reduces its phase noise.

In some embodiments, an analog circuit component configurable in full-power and power-saving modes may include a mixer circuit. An exemplary mixer circuit may be generated by inserting mixer quads between the collectors of devices 66a-b and resistors 68a-b, respectively, in the configuration of FIG. 4. Such a mixer may be switched between full-power and power-saving modes using PCC devices 58a-b as described above. In the full-power more, the mixer uses a high level of power and exhibits superior linearity, as measured for example by the IP3 parameter. In the power-saving mode, the mixer uses less power and displays degraded linearity.

The exemplary power control systems and methods described above allow configuring a radio communications system in two modes, each representing a different tradeoff between power consumption and circuit performance (as measured by e.g. linearity, roll-off, phase noise). For example, in a perfectly linear system, an input signal of a given input frequency results in an output signal purely at that frequency. Real circuits exhibit some non-linearity, which results in output signals having higher-harmonic frequency components. The presence of multiple frequencies leads to undesirable intermodulation, or mixing of signals to generate additional signals which are not harmonics of the original signals. Such additional signals may distort and interfere with generating accurate output RF signals. The linearity of analog circuits including active devices (e.g. CMOS or bipolar transistors) generally varies with their power consumption. When a full power level is supplied to an analog circuit stage, the stage is generally more linear and exhibits less intermodulation and resulting noise and/or distortion.

Configuring analog circuit stages in a full power mode is particularly useful when the communications device is docked and thus connected to a power supply external to the radio receiver device. Docking stations are often situated indoors or inside vehicles, where signal obstructions make improved receiver sensitivity particularly desirable. Supplying higher power levels to analog circuit stages allows improving the radio receiver circuit's sensitivity. When the radio receiver is mobile and disconnected from an external power supply, receiver analog circuit stages are configured in a power saving mode to improve battery life. Un-docked radio receivers are often used outdoors, where signal obstructions are often of less concern than indoors, and thus a lower receiver sensitivity may be acceptable to the end user.

Acceptable tradeoffs between receiver performance (measured for example as sensitivity or linearity) and available power budgets may be determined empirically for a given circuit design. For a given circuit, a system designer may first select a performance metric (e.g. linearity/IP3, filter roll-off) values deemed acceptable for each of the two modes, and select appropriate power budgets to achieve the two performance metric values.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
   in response to determining that a radio-frequency receiver is connected to an external power source, setting a circuit configuration of an analog circuit component of an analog signal-processing circuit of the radio-frequency receiver to a full-power configuration to generate a full-power-consumption radio-frequency receiver output signal; and
   in response to determining that the radio-frequency receiver is not connected to an external power source, setting the circuit configuration of the analog circuit component to a power-saving, scaled-down power configuration to generate a reduced-power-consumption radio-frequency receiver output signal encoding content to be played back to a radio-frequency receiver end user;
   wherein switching the configuration of the analog circuit component between the full-power configuration and the power-saving, scaled-down power configuration comprises activating or de-activating a first part of the analog circuit component, wherein a second part of the analog circuit component is active in both the full-power configuration and the power-saving, scaled-down power configuration, and wherein switching between the full-power and the power-saving, scaled-down power configuration comprises activating the gate of a power control transistor to interconnect two internal nodes of the signal processing circuit.

2. The method of claim 1, wherein switching the configuration of the analog circuit component from the full-power configuration to the power-saving, scaled-down power configuration comprises reducing a current passing through a transistor of the analog circuit component.

3. The method of claim 1, wherein switching the configuration of the analog circuit component from the full-power configuration to the power-saving, scaled-down power configuration comprises turning off a current path through a transistor of the analog circuit component.

4. The method of claim 1, wherein switching the configuration of the analog circuit component from the full-power configuration to the power-saving, scaled-down power configuration comprises reducing a number of active stages of the analog circuit component.

5. The method of claim 1, wherein switching between the full-power configuration and the power-saving, scaled-down power configuration comprises inserting a resistor into the signal processing circuit to change a voltage of an internal node of the signal processing circuit.

6. The method of claim 1, wherein switching between the full-power configuration and the power-saving, scaled-down power configuration comprises connecting an internal node of the signal processing circuit to a power source.

7. The method of claim 1, wherein switching between the full-power configuration and the power-saving, scaled-down power configuration comprises inserting a circuit section including a set of active devices into the signal processing circuit.

8. The method of claim 1, wherein determining that the radio-frequency receiver is connected to the external power source comprises determining that the radio-frequency receiver is positioned in a receiver cradle.

9. The method of claim 1, further comprising employing a digital baseband processor connected to the analog signal processing circuit to generate the radio-frequency receiver output signal.

10. The method of claim 1, wherein switching the configuration of the analog circuit component from the full-power configuration to the power-saving, scaled-down power configuration comprises activating the first part of the analog circuit component.

11. The method of claim 1, wherein switching the configuration of the analog circuit component from the full-power configuration to the power-saving, scaled-down power configuration comprises de-activating the first part of the analog circuit component.

12. A radio-frequency receiver comprising:
an analog radio-frequency receiver signal processing circuit configured to process a set of electric signals derived from a set of input radio-frequency signals; and
a power control circuit connected to the signal processing circuit and configured to, in response to a determination whether the radio-frequency receiver is connected to an external power source,
set a circuit configuration of an analog circuit component of the signal processing circuit to a full-power configuration when the radio-frequency receiver is connected to the external power source, wherein the radio-frequency receiver employs the analog circuit component in the full-power configuration to generate a full-power-consumption radio-frequency receiver output signal; and
set the circuit configuration of the analog circuit component to a power-saving, scaled-down power configuration when the radio-frequency receiver is not connected to the external power source, wherein the radio-frequency receiver employs the analog circuit component in the power-saving, scaled-down power configuration to generate a reduced-power-consumption radio-frequency receiver output signal encoding content to be played back to a radio-frequency receiver end user;
wherein switching the configuration of the analog circuit component between the full-power configuration and the power-saving, scaled-down power configuration comprises activating or de-activating a first part of the analog circuit component, wherein a second part of the analog circuit component is active in both the full-power configuration and the power-saving, scaled-down power configuration, and wherein switching between the full-power and the power-saving, scaled-down power configuration comprises activating the gate of a power control transistor to interconnect two internal nodes of the signal processing circuit.

13. The receiver of claim 12, further comprising a power source detection circuit connected to the power control circuit and configured to determine whether the radio-frequency receiver is connected to the external power source, and to transmit to the power control circuit an indicator of whether the radio-frequency receiver is connected to the external power source.

14. The receiver of claim 12, wherein switching the configuration of the analog circuit component from the full-power configuration to the power-saving, scaled-down power configuration comprises reducing a current passing through a transistor of the analog circuit component.

15. The receiver of claim 12, wherein switching the configuration of the analog circuit component from the full-power configuration to the power-saving, scaled-down power configuration comprises turning off a current path through a transistor of the analog circuit component.

16. The receiver of claim 12, wherein switching the configuration of the analog circuit component from the full-power configuration to the power-saving, scaled-down power configuration comprises reducing a number of active stages of the analog circuit component.

17. The receiver of claim 12, further comprising a resistor insertable into the signal processing circuit under a control of the power control circuit to change a voltage of an internal node of the signal processing circuit to switch the configuration of the analog circuit component between the full-power configuration and the power-saving, scaled-down power configuration.

18. The receiver of claim 12, wherein switching the configuration of the analog circuit component between the full-power configuration and the power-saving, scaled-down power configuration comprises connecting an internal node of the signal processing circuit to a power source node.

19. The receiver of claim 12, further comprising a circuit section including a set of active devices insertable into the signal processing circuit under a control of the power control circuit to switch the configuration of the analog circuit component between the full-power configuration and the power-saving, scaled-down power configuration.

20. The receiver of claim 12, wherein the signal processing circuit comprises a digital baseband processor connected to the analog circuit component and configured to generate the radio-frequency receiver output signal.

21. The receiver of claim 12, wherein the determination that the radio-frequency receiver is connected to the external power source comprises a determination that the radio-frequency receiver is positioned in a receiver cradle.

22. The receiver of claim 12, wherein switching the configuration of the analog circuit component from the full-power configuration to the power-saving, scaled-down power configuration comprises activating the first part of the analog circuit component.

23. The receiver of claim 12, wherein switching the configuration of the analog circuit component from the full-power configuration to the power-saving, scaled-down power configuration comprises de-activating the first part of the analog circuit component.

24. A radio-frequency receiver comprising:
means for determining whether the radio-frequency receiver is connected to an external power source;
means, responsive to the means for determining whether the radio-frequency receiver is connected to the external power source, for setting a circuit configuration of an analog circuit component of a signal processing circuit of the radio-frequency receiver to a full-power configuration when the radio-frequency receiver is connected to the external power source, wherein the analog circuit component is selected from a group consisting of an amplifier, an oscillator, a filter, and a mixer, and wherein the radio-frequency receiver employs the analog circuit component in the full-power configuration to generate a full-power-consumption radio-frequency receiver output signal; and means, responsive to the means for determining whether the radio-frequency receiver is connected to the external power source, for setting the circuit configuration of the analog circuit component to a power-saving, scaled-down power configuration when the radio-frequency receiver is not connected to the external power source, wherein the radio-frequency receiver employs the analog circuit component in the power-saving, scaled-down power configuration to generate a reduced-power-consumption radio-frequency receiver output signal encoding content to be played back to a radio-frequency receiver end user;

wherein switching the configuration of the analog circuit component between the full-power configuration and the power-saving, scaled-down power configuration comprises activating or de-activating a first part of the analog circuit component, wherein a second part of the analog circuit component is active in both the full-power configuration and the power-saving, scaled-down power configuration, and wherein switching between the full-power and the power-saving, scaled-down power configuration comprises activating the gate of a power control transistor to interconnect two internal nodes of the signal processing circuit.

25. An integrated circuit comprising:
a signal processing circuit; and
a power control circuit connected to the signal processing circuit and configured to, in response to a determination whether a radio-frequency receiver incorporating the signal processing circuit is connected to an external power source,
   set a circuit configuration of an analog circuit component of the signal processing circuit to a full-power configuration when the radio-frequency receiver is connected to the external power source, wherein the analog circuit component is selected from a group consisting of an amplifier, an oscillator, a filter, and a mixer; and
   set a circuit configuration of the analog circuit component to a power-saving, scaled-down power configuration when the radio-frequency receiver is not connected to the external power source to generate a reduced-power-consumption radio-frequency receiver output signal encoding content to be played back to a radio-frequency receiver end user;
   wherein switching the configuration of the analog circuit component between the full-power configuration and the power-saving, scaled-down power configuration comprises activating or de-activating a first part of the analog circuit component, wherein a second part of the analog circuit component is active in both the full-power configuration and the power-saving, scaled-down power configuration, and wherein switching between the full-power and the power-saving, scaled-down power configuration comprises activating the gate of a power control transistor to interconnect two internal nodes of the signal processing circuit.

26. An integrated circuit comprising:
means for determining whether a signal processing circuit is connected to an external power source;
means, responsive to the means for determining whether the signal processing circuit is connected to the external power source, for setting a circuit configuration of an analog circuit component of the signal processing circuit to a full-power configuration when the signal processing circuit is connected to the external power source, wherein the analog circuit component is selected from a group consisting of an amplifier, an oscillator, a filter, and a mixer; and
means, responsive to the means for determining whether the signal processing circuit is connected to the external power source, for setting the circuit configuration of the analog component to a power-saving, scaled-down power configuration when the signal processing circuit is not connected to the external power source, to generate a reduced-power-consumption radio-frequency receiver output signal encoding content to be played back to a radio-frequency receiver end user;

wherein switching the configuration of the analog circuit component between the full-power configuration and the power-saving, scaled-down power configuration comprises activating or de-activating a first part of the analog circuit component, wherein a second part of the analog circuit component is active in both the full-power configuration and the power-saving, scaled-down power configuration, and wherein switching between the full-power and the power-saving, scaled-down power configuration comprises activating the gate of a power control transistor to interconnect two internal nodes of the signal processing circuit.

\* \* \* \* \*